US012793884B2

(12) United States Patent
Yamamoto et al.

(10) Patent No.: US 12,793,884 B2
(45) Date of Patent: Nov. 10, 2026

(54) COIL COMPONENT

(71) Applicant: Murata Manufacturing Co., Ltd., Kyoto-fu (JP)

(72) Inventors: Shigeto Yamamoto, Nagaokakyo (JP); Ken Hayashii, Nagaokakyo (JP); Ryota Hashimoto, Nagaokakyo (JP); Shingo Nakamoto, Nagaokakyo (JP); Kaori Takezawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 556 days.

(21) Appl. No.: 18/494,676

(22) Filed: Oct. 25, 2023

(65) Prior Publication Data

US 2024/0145158 A1 May 2, 2024

(30) Foreign Application Priority Data

Oct. 31, 2022 (JP) ................................ 2022-174439

(51) Int. Cl.
*H01F 27/28* (2006.01)
*H01F 27/29* (2006.01)

(52) U.S. Cl.
CPC ......... *H01F 27/2823* (2013.01); *H01F 27/29* (2013.01)

(58) Field of Classification Search
CPC ............................ H01F 27/2823; H01F 27/29
See application file for complete search history.

(56) References Cited

U.S. PATENT DOCUMENTS

2016/0118184 A1* 4/2016 Ukai ..................... H01F 17/045 336/192
2017/0294264 A1* 10/2017 Hashimoto ......... H01F 27/2823
2018/0211764 A1* 7/2018 Komaya ................. H01F 17/04
2019/0378642 A1* 12/2019 Sukegawa ............... H01F 27/24
2021/0012949 A1* 1/2021 Miyamoto .......... H01F 27/2823

FOREIGN PATENT DOCUMENTS

JP 2005044858 A * 2/2005
JP 6327397 B2 5/2018
WO WO-2022097421 A1 * 5/2022 ........... H01F 27/263

OTHER PUBLICATIONS

Japanese Patent Office—Decision to Grant a Patent (Translated) 2025 (Year: 2025).*

* cited by examiner

*Primary Examiner* — Malcolm Barnes
(74) *Attorney, Agent, or Firm* — Studebaker Brackett PLLC

(57) ABSTRACT

A coil component includes a first wire wound to form a first layer in a direction from a first end toward a second end, and a second wire wound around the first wire to form a second layer in the direction from the first end toward the second end while turns of the second wire fit in recesses formed between adjacent turns of the first wire. The second wire subsequently turns back from the end positioned closer to the second end toward the first end and extends to an outer side of the second layer. Then, the second wire is wound around the second layer to form a third layer while turns of the second wire fit in recesses formed between adjacent turns of the second wire in the second layer. The second wire subsequently extends to the second layer on the outer side of the first layer.

12 Claims, 7 Drawing Sheets

COIL COMPONENT

CROSS-REFERENCE TO RELATED APPLICATION

This application claims benefit of priority to Japanese Patent Application No. 2022-174439, filed Oct. 31, 2022, the entire content of which is incorporated herein by reference.

BACKGROUND

Technical Field

The present disclosure relates to a coil component, and in particular, to a wire-wound coil component in which two wires are wound around a winding core portion to form multiple layers. More particularly, the present disclosure relates to an improvement in winding of the wires of the wire-wound coil component.

Background Art

In the present disclosure, the n-th turn of a first wire and a second wire when wound around a winding core portion is referred to as a "turn Tn". Regarding shift in position of the first wire and the second wire relative to each other when, for example, a turn Tn of the second wire fits in a recess formed by adjacent turns Tn and Tn+1 of the first wire, the amount of shift in this case is 0.5 turns. Similarly, when a turn Tn+2 of the second wire fits in a recess formed by adjacent turns Tn and Tn+1 of the first wire, the amount of shift in this case is 1.5 turns. Moreover, when a turn Tn+3 of the second wire fits in a recess formed by adjacent turns Tn and Tn+1 of the first wire, the amount of shift in this case is 2.5 turns. Regarding the shifting direction of the second wire shifting in position relative to the first wire, when a particular turn of the second wire is positioned closer, than the same number turn of the first wire, to the end of winding, the amount of shift is labeled with a "+" sign. For the opposite case, the amount of shift is labeled with a "−" sign.

When turns of a wire is counted, the counting can start either from a first end of the winding core portion or from a second end thereof. The direction of counting does not change characteristic features of embodiments.

In the present disclosure, when a wire is wound around the winding core portion and the wire forms multiple layers, a layer closest to peripheral surfaces of the winding core portion, in other words, a layer in contact, at least partially, with the peripheral surfaces of the winding core portion, is referred to as a first layer. Similarly, a layer formed on the outer side of the first layer is referred to as a second layer, and a layer formed on the outer side of the second layer is referred to as a third layer. When a wire is wound around the peripheral surfaces of the winding core portion, the wire normally does not come into contact entirely with the peripheral surfaces. For example, the wire rises slightly from the peripheral surfaces although the wire is in contact with edges of the winding core portion having a rectangular cross section. This is why the first layer is described above as "a layer in contact, at least partially, with the peripheral surfaces of the winding core portion."

A typical example of the coil component to which the present disclosure is directed is a common mode choke coil.

A common mode choke coil to which the present disclosure pertains is described, for example, in Japanese Patent 6327397. FIG. 11A is a cross-sectional view schematically illustrating characteristic features of winding of two wires, or wires 51 and 52, included in a coil component 50 described in Japanese Patent 6327397. The coil component 50 serves as the common mode choke coil. FIG. 11A corresponds to FIG. 2, FIG. 7, or FIG. 8 contained in Japanese Patent 6327397, and FIG. 11B is provided for explaining a problem to be addressed.

In FIGS. 11A and 11B, the cross section of the first wire 51 is dotted to distinguish between the first wire 51 and the second wire 52. The first wire 51 and the second wire 52 are wound helically around a winding core portion 53 in a direction from a first end 54 of the winding core portion 53 toward a second end 55 thereof positioned opposite to the first end 54. The number of turns around the winding core portion is substantially the same between the first wire 51 and the second wire 52. The first wire 51 is wound around the peripheral surfaces of the winding core portion 53 so as to form the first layer. The second wire 52 is wound around the outer side of the first layer so as to form the second layer while most of turns of the second wire 52 fit in recesses formed between adjacent turns of the first wire 51.

Some turns of the second wire 52, such as a turn Tn and a turn Tn+1, are wound around so as to be in contact with the peripheral surfaces of the winding core portion 53. That is why it is described above that "most of turns of the second wire 52 fit in recesses formed between adjacent turns of the first wire 51" when the second wire 52 is wound around the outer side of the first layer so as to form the second layer.

In FIGS. 11A and 11B, turns of the first wire 51 are connected by line segments to corresponding turns of the second wire 52. In other words, each turn of the first wire 51 and the corresponding turn of the second wire 52 connected by a line segment to the turn of the first wire 51 are labeled with the same number counting from the first end 54.

The coil component 50 described in Japanese Patent 6327397 has been developed to improve the mode conversion characteristics in a common mode choke coil. The embodiment of the coil component 50 illustrated in FIG. 11A has the following features.

When a particular turn of the first wire 51 and the second wire 52 is referred to as the n-th turn (n is a natural number) by counting from the first end 54, the coil component 50 includes: i) a +0.5 shift region 57 in which a turn Tn of the second wire 52 fits in a recess formed between a turn Tn and a turn Tn+1 of the first wire 51, and the second wire 52 is positionally shifted from the first wire 51 by 0.5 turns; ii) a −1.5 shift region 58 in which a turn Tn+2 of the second wire 52 fits in a recess formed between a turn Tn and a turn Tn+1 of the first wire 51, and the second wire 52 is positionally shifted from the first wire 51 by 1.5 turns in the shifting direction opposite to the shifting direction of the +0.5 shift region 57 above; and iii) a transition region 59 in which the winding of the second wire 52 changes from the +0.5 shift region 57 to the −1.5 shift region 58.

In addition, the total number of turns of the second wire 52 in the 0.5 shift region 57 above is twice or more and five times or less (i.e., from twice to five times) of the total number of turns of the second wire 52 in the 1.5 shift region 58 described above.

With this configuration, the capacitance generated between the first wire 51 and the second wire 52 can be balanced over the first wire 51 and the second wire 52, which can reduce the negative impact of the stray capacitance generated between the first wire 51 and the second wire 52. Accordingly, this can also improve the mode conversion characteristics in the case of the coil component 1 being used as the common mode choke coil.

SUMMARY

Focusing on the second wire 52 in the winding state illustrated in FIG. 11A, a turn Tn+2 of the second wire 52 positioned at a leading end of the −1.5 shift region 58 is not in contact with any other turn on the side closer to the first end 54. A turn Tn+1 positioned at a trailing end of the transition region 59 is not in contact with any other turn on the side closer to the first end 54, either. Accordingly, a turn Tn+2 tends to be displaced in a direction indicated by arrow 60 in FIG. 11A. As a result, as illustrated in FIG. 11B, the turn Tn+2 may cross over the turn Tn+1 and fall in between the turn Tn and the turn Tn+1. If the distance between the turn Tn and the turn Tn+1 is large, although not illustrated in FIG. 11B, the turn Tn+2 may come into contact with the peripheral surfaces of the winding core portion 53.

An event in which the turn Tn+2 falls into the lower layer may occur in a finished product of the coil component 50. If this occurs in the process of winding the second wire 52 from the first end 54 toward the second end 55, subsequent turns Tn+3 and thereafter are also displaced successively. As a result, the −1.5 shift region 58 may become, for example, a −2.5 shift region. This may disturb the balance of capacitance between the first wire 51 and the second wire 52, which may deteriorate the mode conversion characteristics.

Such a problem caused by the positional shift may occur not only in the common mode choke coil but also in a wire-wound chip transformer having the first wire and the second wire.

Accordingly, the present disclosure provides a coil component that can reduce the occurrence of positional shifting of a wire wound around a winding core portion in multiple layers.

According to an aspect of the present disclosure, a coil component includes a core including a winding core portion having a first end and a second end, the first end and the second end being opposite to each other in an axial direction of the winding core portion. The coil component also includes a first wire and a second wire that are wound helically around the winding core portion and have a substantially same number of turns around the winding core portion.

The first wire and/or the second wire forms layers of turns around the winding core portion, and the layers includes a first layer positioned closest to peripheral surfaces of the winding core portion, a second layer formed on an outer side of the first layer, and a third layer formed on an outer side of the second layer.

The first wire includes a portion in which the first wire is wound around the winding core portion so as to form the first layer in a direction from the first end toward the second end.

The second wire includes i) a first portion in which the second wire is wound around the outer side of the first layer so as to form the second layer in the direction from the first end toward the second end while turns of the second wire fit in recesses formed between adjacent turns of the first wire, ii) a second portion that continues from the first portion and in which the second wire turns back toward the first end from an end of the first portion positioned closer to the second end and extends to the outer side of the second layer, iii) a third portion that continues from the second portion and in which the second wire is wound around the outer surface of the second layer so as to form the third layer, iv) a fourth portion that extends from the third portion to the second layer on the outer side of the first layer, and v) a fifth portion that continues from the fourth portion and in which the second wire is wound around the outer side of the first layer so as to form the second layer in the direction from the first end toward the second end while turns of the second wire fit in recesses formed between adjacent turns of the first wire in the first layer.

The second wire is wound by N turns (N is a natural number equal to or greater than two) in the third portion.

In addition, a +0.5 shift region, which is a region in which the second wire is positionally shifted from the first wire by 0.5 turns, is present on either one of a side closer to the first end and a side closer to the second end with respect to a boundary between the first portion and the fifth portion. A −(N−0.5) shift region, which is a region in which the second wire is positionally shifted from the first wire by (N−0.5) turns in a shifting direction opposite to a shifting direction of the +0.5 shift region, is present on the other one of the side closer to the first end and the side closer to the second end with respect to the boundary between the first portion and the fifth portion.

Alternatively, in the coil component, the fifth portion may be configured to continue from the fourth portion and to be positioned one turn of the second wire away from the first portion. In the fifth portion, the second wire may be wound around the outer side of the first layer so as to form the second layer in the direction from the first end toward the second end while turns of the second wire fit in recesses formed between adjacent turns of the first wire in the first layer. In this case, a −(N−1.5) shift region, which is a region in which the second wire is positionally shifted from the first wire by (N−1.5) turns in a shifting direction opposite to a shifting direction of the +0.5 shift region, is present on either one of the side closer to the first end and the side closer to the second end with respect to the boundary between the first portion and the fifth portion.

According to the above configuration, the second wire includes the second portion that continues from the first portion and in which the second wire turns back toward the first end from the end of the first portion closer to the second end and extends to the outer side of the second layer. The second wire also includes the third portion that continues from the second portion and in which the second wire is wound around the outer side of the second layer so as to form the third layer while turns of the second wire fit in recesses formed between adjacent turns of the second wire in the second layer. As a result, the occurrence of the displacement of the second wire can be reduced.

In addition, the +0.5 shift region, which is the region in which the second wire is positionally shifted from the first wire by 0.5 turns, is present on either one of the side closer to the first end and the side closer to the second end with respect to a boundary between the first portion and the fifth portion. Moreover, a −(N−0.5) shift region, which is a region in which the second wire is positionally shifted from the first wire by (N−0.5) turns in the shifting direction opposite to the shifting direction of the +0.5 shift region, or alternatively, a −(N−1.5) shift region, which is a region in which the second wire is positionally shifted from the first wire by (N−1.5) turns in the shifting direction opposite to the shifting direction of the +0.5 shift region, is present on the other one of the side closer to the first end and the side closer to the second end with respect to the boundary between the first portion and the fifth portion. This reduces the negative impact of the stray capacitance generated between the first wire and the second wire. Accordingly, this can improve the mode conversion characteristics in the case of the coil component being used, for example, as the common mode choke coil.

DETAILED DESCRIPTION

Figure 1:
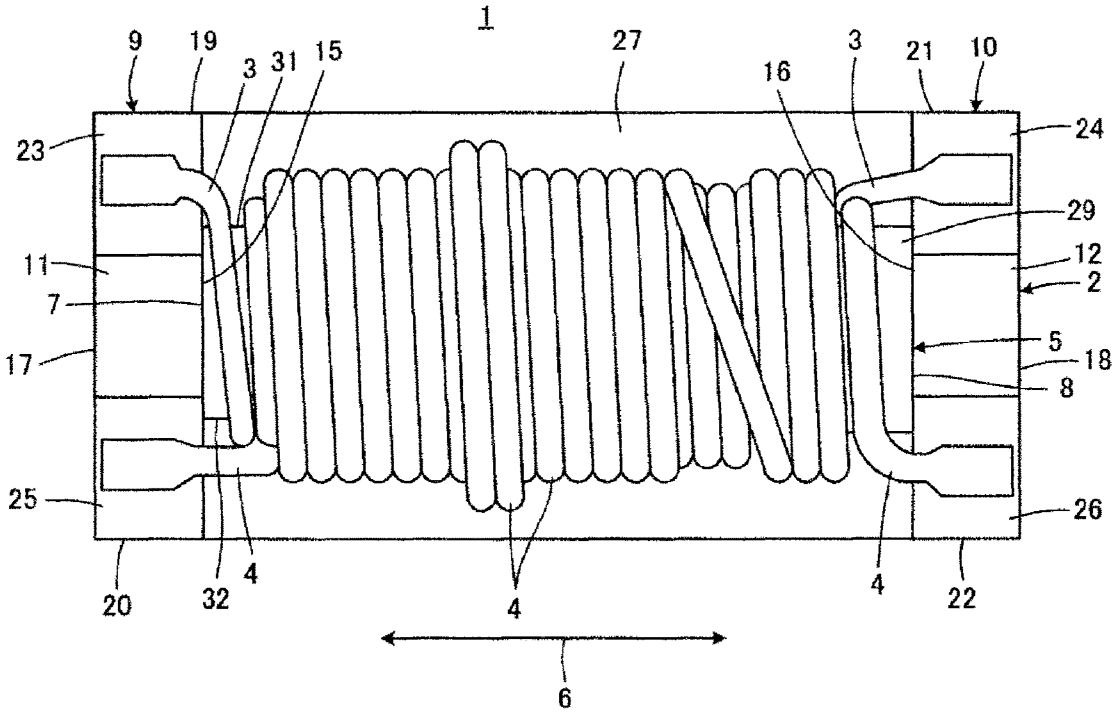
FIG. 1 is a view illustrating a coil component 1 according to a first embodiment of the disclosure, showing a side of the coil component that faces a circuit board.

FIG. 1 is a view illustrating a coil component 1 according to a first embodiment of the present disclosure, the view showing a side of the coil component 1 that faces a circuit board (not illustrated). The coil component 1 serves as a common mode choke coil.

The coil component 1 includes a drum-like core 2 and a first wire 3 and a second wire 4. The first wire 3 and the second wire 4 serve as inductors. The core 2 is made of a non-conductive material. For example, the core 2 is made of a Ni—Zn based ferrite or a resin containing ferrite powder or magnetic metal powder.

The core 2 includes a winding core portion 5, a first flange 9, and a second flange 10. The first flange 9 and the second flange 10 are formed respectively at a first end 7 and a second end 8 of the winding core portion 5 that are positioned oppositely in the axial direction 6 of the winding core portion 5. The winding core portion 5 has a quadrangular cross section when cut in the direction perpendicular to the axial direction 6. Edges of the quadrangular winding core portion 5 may be rounded. Alternatively, the winding core portion 5 may have a cross section shaped like a polygon, such as a hexagon, a circle, an oval, or an appropriate combination of these.

The first flange 9 and the second flange 10 are shaped like quadrangular prisms. The first flange 9 has a bottom surface 11, a top surface 13 (see FIGS. 2A and 2B), an inside surface 15, an outside surface 17, a first side surface 19, and a second side surface 20. The bottom surface 11 faces a circuit board on which the coil component is to be mounted, and the top surface 13 faces opposite to the bottom surface 11. The inside surface 15 of the first flange 9 is positioned at the first end 7 of the winding core portion 5, and the outside surface 17 is positioned opposite to the inside surface 15 so as to face outward. Both the first side surface 19 and the second side surface 20 extend between the bottom surface 11 and the top surface 13 and also between the inside surface 15 and the outside surface 17. Similarly, the second flange 10 has a bottom surface 12, a top surface 14, an inside surface 16, an outside surface 18, a first side surface 21, and a second side surface 22. The bottom surface 12 faces the circuit board, and the top surface 14 faces opposite to the bottom surface 12. The inside surface 16 of the second flange 10 is positioned at the second end 8 of the winding core portion 5, and the outside surface 18 is positioned opposite to the inside surface 16 so as to face outward. Both the first side surface 21 and the second side surface 22 extend between the bottom surface 12 and the top surface 14 and also between the inside surface 16 and the outside surface 18. Edges of the first flange 9 and the second flange 10 are rounded.

The coil component has at least four terminal electrodes. In the present embodiment, the coil component 1 includes four terminal electrodes 23 to 26. A first terminal electrode 23 and a third terminal electrode 25 are formed at the bottom surface 11 of the first flange 9, and a second terminal electrode 24 and a fourth terminal electrode 26 are formed at the bottom surface 12 of the second flange 10. Although not illustrated, the first terminal electrode 23 and the third terminal electrode 25 extend over part of the outside surface 17 of the first flange 7, and the second terminal electrode 24 and the fourth terminal electrode 26 extend over part of the outside surface 18 of the second flange 8.

For example, the terminal electrodes 23 to 26 are formed in the following manner. An electroconductive paste containing silver as a conducting component is applied onto the bottom surfaces 11 and 12 and subsequently baked. Extension portions of the terminal electrodes 23 to 26 on respective outside surfaces 17 and 18 are formed by vapor deposition of silver. These silver base-conductor layers are plated with copper, nickel, and tin successively in this order. Alternatively, the terminal electrodes 23 to 26 may be formed by adhering metallic terminals made of a conductive metal onto the core 2 using an epoxy-based adhesive.

The first wire 3 and the second wire 4 are wound helically around the winding core portion 5. Details of the winding of the first wire 3 and the second wire 4 will be described later. Each of the first wire 3 and the second wire 4 includes a core conductor wire made of a conductive metal, such as copper, silver, or gold and also includes an insulating cover that covers the core conductor. The insulating cover is made of a resin, such as polyurethane or polyamide-imide. The diameter of the core conductor wire is not specifically limited. The number of turns of the first wire 3 and that of the second wire 4 are not specifically limited, either. The diameter of the first wire 3 and the second wire 4, however, is preferably 20 to 100 μm.

Opposite ends of the first wire 3 are connected to the first terminal electrode 23 and the second terminal electrode 24, and opposite ends of the second wire 4 are connected to the third terminal electrode 25 and the fourth terminal electrode 26. Thermocompression bonding is used for the above connection.

The coil component 1 further includes a top plate 27. The top plate 27 is made of the same ferrite as that of the core 2 or of a non-conductive magnetic material other than the ferrite or a resin containing ferrite powder or magnetic metal powder. The top plate 27 is suspended between the first flange 9 and the second flange 10 of the core 2. In this state, the top plate 27 is adhered to the top surface 13 of the first flange 9 and to the top surface 14 of the second flange 10 using an adhesive. The adhesive to be used here is preferably an epoxy resin having a thermosetting property or a composite magnetic resin made of the thermosetting epoxy resin containing magnetic metal powder or ferrite powder of a grain diameter of 0.1 to 10 μm. The adhesive may contain an inorganic filler, such as silica filler or an inorganic magnetic filler in order to improve heat shock tolerance. In application of an adhesive, the top surfaces 13 and 14 of the flanges 9 and 10 of the core 2 may be dipped in the adhesive. Alternatively, the adhesive may be applied to the core-facing surface of the top plate 27 using an adhesive dispenser or printing.

The core 2 may be coated with a resin instead of providing the top plate 27. The core 2 does not need to have the top plate 27 nor the coating.

The coil component 1 can be manufactured in the following manner.

In manufacturing the core 2, the ferrite powder is pressed using dies to form a compact, and subsequently the compact is subjected to barrel polishing to remove burrs.

Next, to form terminal electrodes 23 to 26 on the above core 2, the base conductor layer is formed on the core 2, and then the core 2 is subjected to barrel plating.

Next, the wires 3 and 4, which are delivered out of the nozzles, are wound around the winding core portion 5 of the core 2. The wires 3 and 4 are normally wound around separately. More specifically, the first wire 3 is wound first and the end portions of the first wire 3 are thermally press-bonded to the first terminal electrode 23 and the second terminal electrode 24 using a heater chip. Next, the second wire 4 is wound and the end portions of the second wire 4 are also thermally press-bonded to the third terminal electrode 25 and the fourth terminal electrode 26 using a heater chip. Residual portions of the wires 3 and 4 are cut off after bonded to the terminal electrodes 23 to 26. The first wire 3 and the second wire 4 may be wound around simultaneously.

Subsequently, the top plate 27 is adhered to the core 2 using an adhesive. The coil component 1 is thus obtained. The dimensions of the coil component 1 are not specifically limited here. For example, the length in the axial direction 6 may be 3.2 mm, the width is 2.5 mm (the length in the up-down direction of the image of FIG. 1), and the height is 2.5 mm (the length in the direction orthogonal to the image in FIG. 1).

Figure 2A:
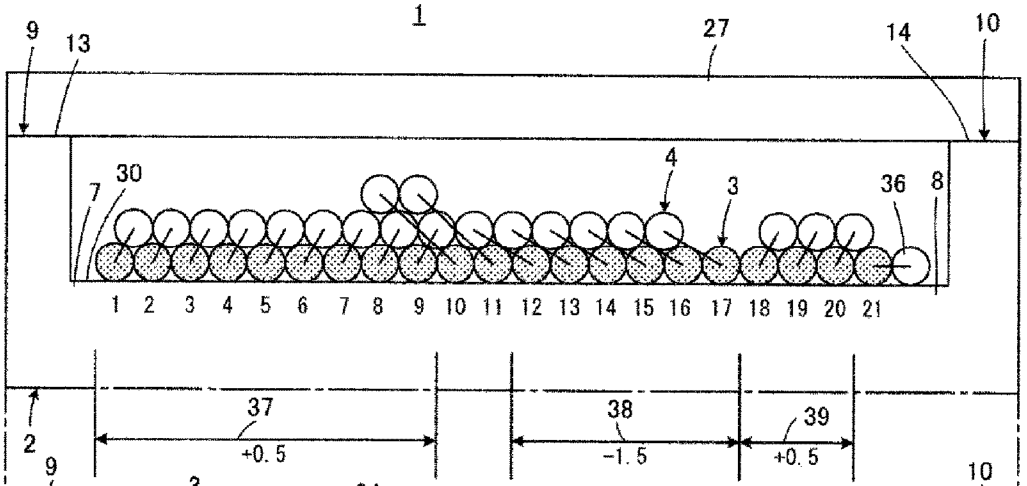
FIGS. 2A and 2B schematically illustrate a state in which a first wire and a second wire are wound in the coil component of FIG. 1, such that FIG. 2A is a cross section taken along line A-A in FIG. 2B to show part of a winding core portion around which the first wire and the second wire are wound, and in FIG. 2B is a development showing peripheral surfaces of the winding core portion around which the first wire and the second wire are wound.
Figure 2B:
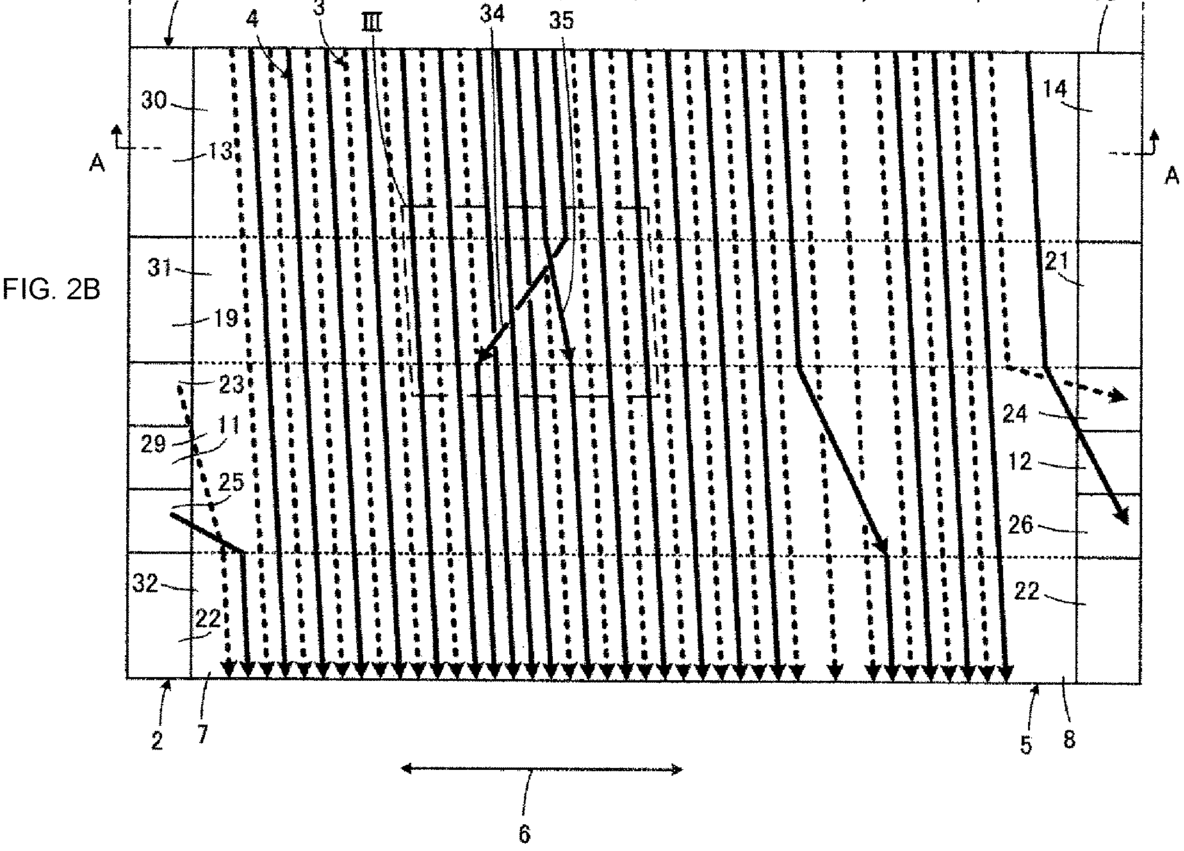
Figure 3:
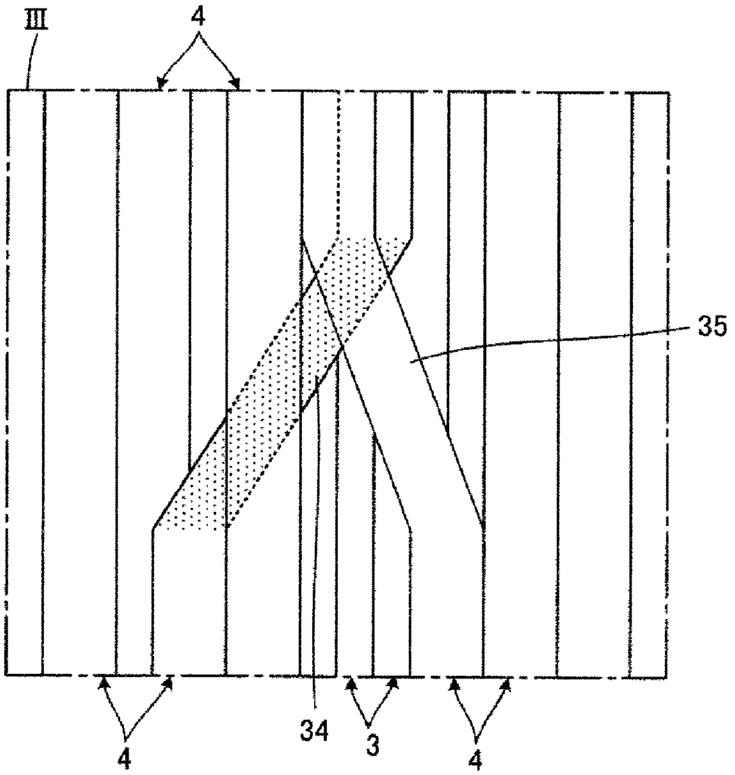
FIG. 3 is an enlarged front view illustrating a region III surrounded by a dashed line in FIG. 2B, showing a wound state of the second wire.

Referring mainly to FIGS. 2A, 2B and 3, the following describes a state in which the first wire 3 and the second wire 4 are wound in the coil component 1 of FIG. 1. FIG. 2A is a cross-sectional view illustrating part of the winding core portion 5 around which the first wire 3 and the second wire 4 are wound. FIG. 2B is a development illustrating peripheral surfaces of the winding core portion 5 around which the first wire 3 and the second wire 4 are wound. FIG. 3 is an enlarged front view illustrating a region III surrounded by a dashed line in FIG. 2B, showing a wound state of the second wire 4.

In FIG. 2A, the cross section of the first wire 3 is dotted to distinguish between the first wire 3 and the second wire 4. The first wire 3 is wound helically around the winding core portion 5 in a direction from the first end 7 toward the second end 8 so as to form a first layer in contact with the peripheral surfaces of the winding core portion 5. The second wire 4 is also wound helically around the winding core portion 5 with the number of turns being substantially the same as that of the first wire 3. Most of turns of the second wire 4 form a second layer over the outer side of the first layer.

In FIG. 2A, turns of the first wire 3 are connected by line segments to corresponding turns of the second wire 4. In other words, each turn of the first wire 3 and the corresponding turn of the second wire 4 connected by a line segment to the turn of the first wire 3 are labeled with the same number counting from the first end 7. The number of a particular turn is provided under the first wire 3 in FIG. 2A. The number indicates the position of a particular turn of the first wire 3 by counting from the first end 7. Accordingly, the turn of the second wire 4 connected by the line segment with the particular turn of the first wire 3 is labeled with the same number. In the state of winding illustrated in FIG. 2A, the first wire 3 and the second wire 4 both have the same number of turns, in other words, have turns T1 to T21.

The above description for FIG. 2A also applies to FIGS. 4 to 10, which will be described later.

As described above, the first flange 9 and the second flange 10 are shaped like quadrangular prisms and have peripheral surfaces consisting of the bottom surfaces 11 and 12, the top surfaces 13 and 14, the first side surfaces 19 and 21, and the second side surfaces 20 and 22, respectively. The winding core portion 5 has a quadrangular cross section when cut in the direction perpendicular to the axial direction 6. The winding core portion 5 has four peripheral surfaces. The four peripheral surfaces of the winding core portion 5 are labeled a bottom surface, a top surface, a first side surface, and a second side surface, which face in the same facing directions of the bottom surfaces, the top surfaces, the first side surfaces, and the second side surfaces of respective flanges 9 and 10.

As illustrated in FIG. 2B, the winding core portion 5 has the peripheral surfaces, which are a bottom surface 29, a top surface 30, a first side surface 31, and a second side surface 32. Note that FIG. 2A shows cross sections of the wires 3 and 4 on the top surface 30 of the winding core portion 5.

In FIG. 2B, the first wire 3 is indicated by thick dotted lines, and the second wire 4 is indicated by thick solid lines. In reality, turns of the first wire 3 in the first layer are almost hidden by turns of the second wire 4. In the development of FIG. 2B, however, the thick dotted lines indicate the positions of the central axis of the first wire 3, and the thick solid lines indicate the positions of the central axis of the second wire 4. Accordingly, in FIG. 2B, the turns of the first wire 3 in the first layer and the turns of the second wire 4 in the second layer are positioned adjacent to each other. As illustrated in FIG. 2A, some turns of the second wire 4 form a third layer. In FIG. 2B, the turns of the second wire 4 in the third layer and corresponding turns of the second wire 4 in the second layer are illustrated at positions adjacent to each other, and the turns of the first wire 3 in the first layer, which are positioned directly below the turns of the second wire 4 in the third layer, are not illustrated.

As described above, the first wire 3 is wound helically around the winding core portion 5 in the direction from the first end 7 toward the second end 8 so as to form the first layer in contact with the peripheral surfaces of the winding core portion 5.

The second wire 4 includes i) a first portion (turns T1 to T9) in which the second wire 4 is wound around the outer side of the first layer in the direction from the first end 7 toward the second end 8 so as to form the second layer while turns of the second wire 4 fit in recesses formed between adjacent turns of the first wire 3; ii) a second portion 34 (from the turn T9 to a turn T10, indicated as the dotted area in FIG. 3) that continues from the first portion and in which the second wire 4 turns back toward the first end 7 from an end of the first portion positioned closer to the second end 8 and extends to the outer side of the second layer; iii) a third portion (the turn T10 and a turn T11) that continues from the second portion 34 and in which the second wire 4 is wound around the outer side of the second layer so as to form the third layer in the direction from the first end 7 toward the second end 8 while turns of the second wire 4 fit in recesses formed between adjacent turns of the second wire 4 in the second layer; iv) a fourth portion 35 (from the turn T11 to a turn T12) that continues from the third portion and in which the second wire 4 extends from an end of the third portion closer to the second end 8 to the second layer on the outer side of the first layer; and v) a fifth portion (the turn T12 to a turn T17) that continues from the fourth portion 35 and is positioned next to the first portion and in which the second wire 4 is wound around the outer side of the first layer so as to form the second layer in the direction from the first end 7 toward the second end 8 while turns of the second wire 4 fit in recesses formed between adjacent turns of the first wire 3 in the first layer.

In the above third portion, the second wire 4 is wound by N turns (N is a natural number equal to or greater than two), or more specifically by two turns, which is the turn T10 and the turn T11.

According to the above configuration, the second wire 4 includes the second portion that continues from the first portion and in which the second wire 4 turns back toward the first end 7 from the end of the first portion closer to the second end 8 and extends to the outer side of the second layer. The second wire 4 also includes the third portion that continues from the second portion and in which the second wire 4 is wound around the outer side of the second layer so as to form the third layer in the direction from the first end 7 toward the second end 8 while turns of the second wire 4 fit in recesses formed between adjacent turns of the second wire 4 in the second layer. In addition, the second wire 4 includes the fifth portion that is positioned next to the first portion. With the above configuration, the occurrence of the displacement of the second wire 4 can be reduced. Accordingly, this enables the fifth portion of the second wire 4 to come to an appropriate winding position and to stay at this position.

A +0.5 shift region 37 is a region in which the second wire 4 is positionally shifted from the first wire 3 by 0.5 turns. The +0.5 shift region 37 is present on either one of the side closer to the first end 7 and the side closer to the second end 8 with respect to the boundary between the first portion and the fifth portion. In the present embodiment, the +0.5 shift region 37 is present on the side closer to the first end 7. A −(N−0.5) shift region is a region in which the second wire 4 is positionally shifted from the first wire 3 by (N−0.5) turns in a shifting direction opposite to the shifting direction in the +0.5 shift region 37. The −(N−0.5) shift region is present on the other one of the side closer to the first end 7 and the side closer to the second end 8 with respect to the boundary between the first portion and the fifth portion. In the present embodiment, the −(N−0.5) shift region, or more specifically a −1.5 shift region 38, is present on the side closer to the second end 8.

This can reduce the negative impact of the stray capacitance generated between the first wire 3 and the second wire 4. This can also improve the mode conversion characteristics in the case of the coil component 1 being used as a common mode choke coil.

Moreover, the second wire 4 in the third portion is wound so as to form the third layer, which can save a space for winding on the peripheral surfaces of the winding core portion 5.

Figure 11A:
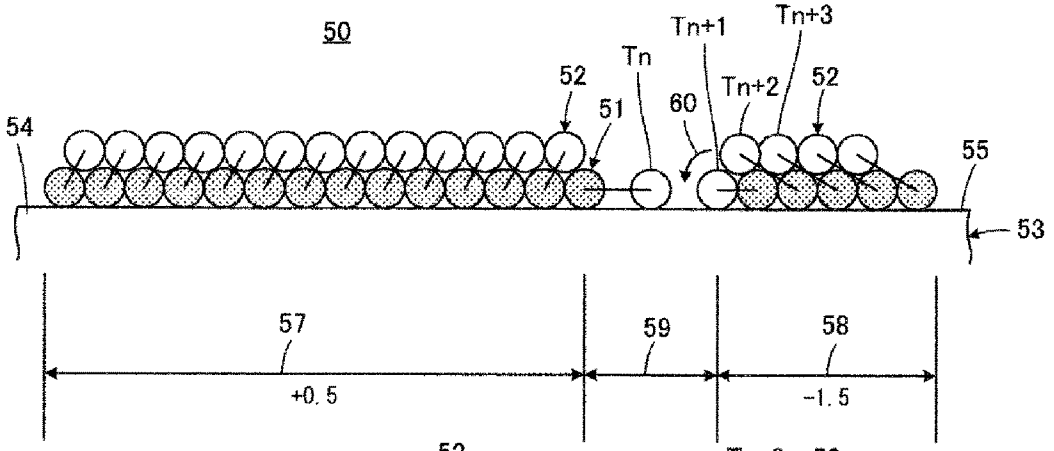
FIGS. 11A and 11B are cross-sectional views schematically illustrating a state in which two wires, or a wire 51 and a wire 52, are wound in a coil component 50 described in Japanese Patent 6327397, with FIG. 11A illustrating a characteristic feature of winding of the wire 51 and the wire 52, and FIG. 11B being provided for explaining a problem addressed by the present disclosure.
Figure 11B:
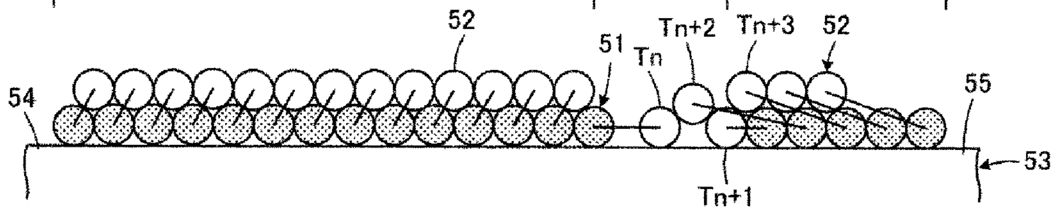

In addition, it is not necessary to provide a relatively large transition region, such as a transition region 59 as illustrated in FIGS. 11A and 11B, between the first portion and the fifth portion. Accordingly, the dimension of the winding core portion 5 in the axial direction 6, which is limited, can be utilized efficiently.

In the present embodiment, the second wire 4 further includes vi) a sixth portion (turns T18 to T20) that continues from the fifth portion and in which the second wire 4 crosses over turns T16 to T18 of the first wire 3 in the first layer and is wound around the outer side of the first layer so as to form the second layer in the direction from the first end 7 toward the second end 8 while turns of the second wire 4 fit in recesses formed between adjacent turns of the first wire 3 in the first layer; and vii) a lower-layer portion 36 that continues from the sixth portion and in which the second wire 4 is wound around so as to be in contact with the peripheral surfaces of the winding core portion 5 and so as to adjoin a side of the final turn of the first wire 3 in the first layer, the side facing the second end 8.

The +0.5 shift region 39 is formed again in the sixth portion. This +0.5 shift region 39 also contributes to a reduction in the negative impact of the stray capacitance generated between the first wire 3 and the second wire 4.

The lower-layer portion 36 contributes to the stability of winding of the second wire 4 and reduces the occurrence of displacement of the second wire 4.

In the present embodiment, as is clear from FIGS. 2A and 2B, the second portion 34 of the second wire 4 is positioned at a peripheral surface of the winding core portion 5 other than the bottom surface 29 and the top surface 30. More specifically, the second portion 34 is positioned on the first side surface 31. As a result of disposing the second portion 34 in this manner, the following advantageous effects can be obtained.

The second portion 34 (from the turn T9 to the turn T10) is the portion in which the second wire 4 turns back toward the first end 7 from the end of the first portion closer to the second end 8 and extends to the position of the second layer on the outer side of the first layer, is present in a region where the second portion 34 of the second wire 4 is present, and the fourth portion 35 (from the turn T11 to the turn T12) is the portion in which the second wire 4 extends from the end of the third portion closer to the second end 8 to the outer side of the second layer. The second portion 34 and the fourth portion 35 of the second wire 4 are present in the same region. Accordingly, in the region where the second portion 34 is present, four turns of the wires are stacked up in the direction normal to the peripheral surface of the winding core portion 5, and this stack of turns protrudes maximum at the peripheral surface of the winding core portion 5.

If this maximum protrusion were positioned at the bottom surface 29 of the winding core portion 5, electrical defects could occur due to the second wire 4 coming into contact with, or coming closer to, the circuit board. If this maximum protrusion were positioned at the top surface 30 of the winding core portion 5, the second wire 4 could come into contact with the top plate 27 or the maximum protrusion could be squashed by the top plate 27.

These problems do not occur if the maximum protrusion is positioned at a peripheral surface of the winding core portion 5 other than the bottom surface 29 and the top surface 30, or more specifically, these problems do not occur if the maximum protrusion is positioned at the first side surface 31 or the second side surface 32. The cross section of the winding core portion 5 can be shaped like a polygon other than the quadrangle, such as a hexagon, or like a circle or an oval. In such a case, the side surface might not be identified easily. That is why the peripheral surface at which the maximum protrusion is positioned is defined above as a surface "other than the bottom surface 29 and the top surface 30".

Referring to FIGS. 4 to 10, the following describes second to eighth embodiments of the present disclosure. In FIGS. 4 to 10, the elements corresponding to those illustrated in FIG. 2A are denoted by the same reference signs, thereby omitting duplicated description.

Figure 4:
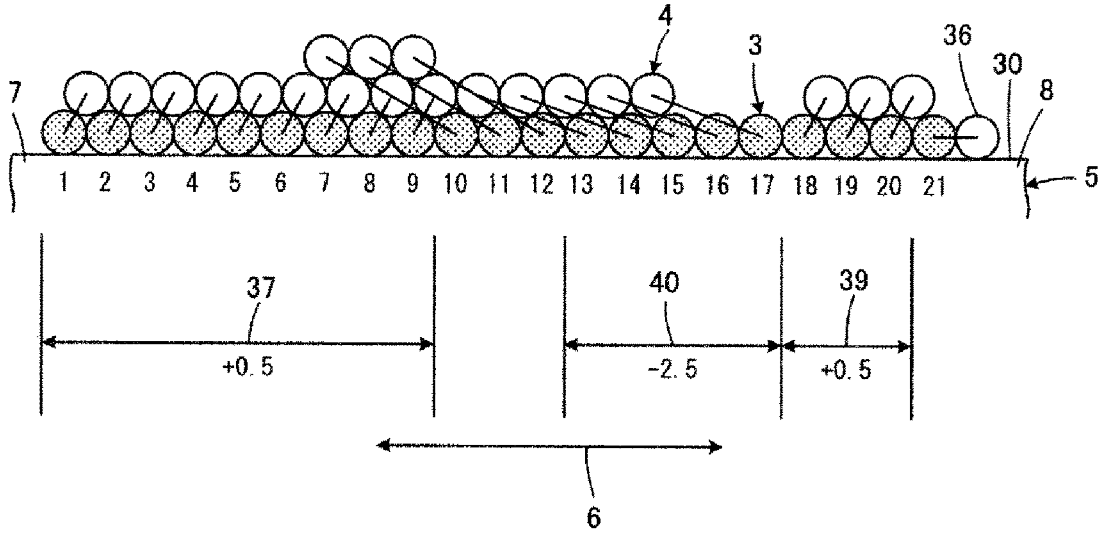
FIG. 4 is a cross-sectional view illustrating part of the winding core portion around which the first wire and the second wire are wound in a coil component according to a second embodiment of the disclosure.

In the second embodiment illustrated in FIG. 4, the second wire 4 in the second portion (from the turn T9 to the turn T10) turns back toward the first end 7 from an end of the first portion positioned closer to the second end 8 and extends to the outer side of the second layer. In the second embodiment, however, the second wire 4 in the second portion turns back further by one more turn compared with the first embodiment illustrated in FIGS. 2A and 2B. In addition, the number of turns of the second wire 4 in the third portion, in which the second wire 4 is wound around the outer side of the second layer so as to form the third layer in the direction from the first end 7 toward the second end 8, is one turn more than the number of turns in the third portion of the first embodiment illustrated in FIGS. 2A and 2B. Moreover, a −2.5 shift region 40 in which the second wire 4 is positionally shifted from the first wire 3 by −2.5 turns is formed in the fifth portion (turns T13 to T17) in which the second wire 4 is wound so as to form the second layer in the direction from the first end 7 toward the second end 8.

Figure 5:
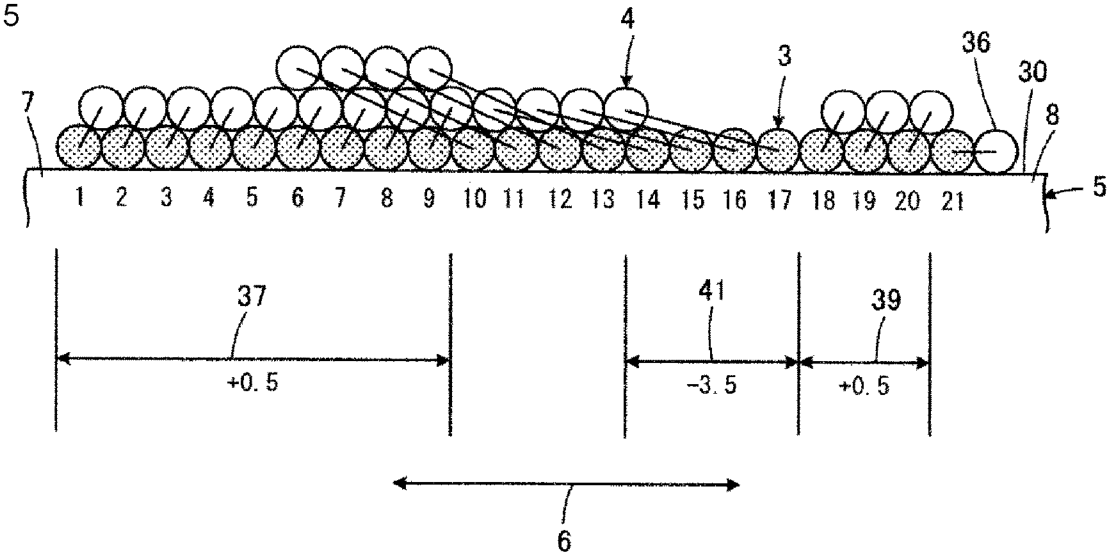
FIG. 5 is a cross-sectional view illustrating part of the winding core portion around which the first wire and the second wire are wound in a coil component according to a third embodiment of the disclosure.

In the third embodiment illustrated in FIG. 5, the second wire 4 in the second portion (from the turn T9 to the turn T10) turns back toward the first end 7 from an end of the first portion positioned closer to the second end 8 and extends to the outer side of the second layer. In the third embodiment, however, the second wire 4 in the second portion turns back further by two more turns compared with the first embodiment illustrated in FIGS. 2A and 2B. In addition, the number of turns of the second wire 4 in the third portion, in which the second wire 4 is wound around the outer side of the second layer so as to form the third layer in the direction from the first end 7 toward the second end 8, is two turns more than the number of turns in the third portion of the first embodiment illustrated in FIGS. 2A and 2B. Moreover, a −3.5 shift region 41 in which the second wire 4 is positionally shifted from the first wire 3 by −3.5 turns is formed in the fifth portion (turns T14 to T17) in which the second wire 4 is wound around so as to form the second layer in the direction from the first end 7 toward the second end 8.

The embodiments illustrated in FIGS. 4 and 5 may be adopted in the case of further adjusting the capacitance balance between the first wire 3 and the second wire 4.

Figure 6:
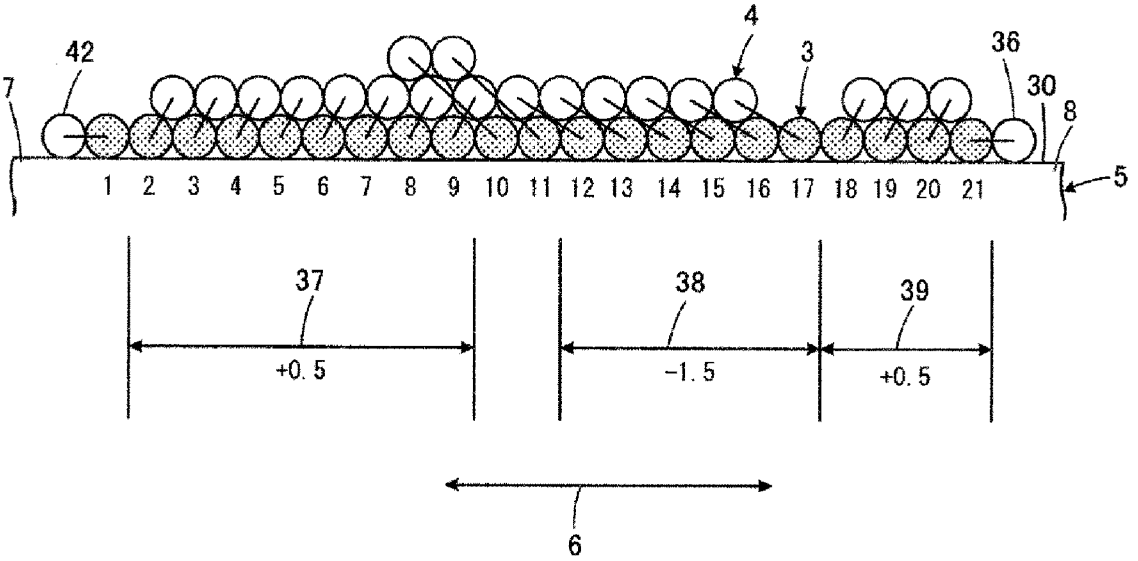
FIG. 6 is a cross-sectional view illustrating part of the winding core portion around which the first wire and the second wire are wound in a coil component according to a fourth embodiment of the disclosure.

The fourth embodiment illustrated in FIG. 6 is different from the first embodiment illustrated in FIGS. 2A and 2B in that the first turn T1 of the second wire 4 is disposed as a lower-layer portion 42 of the second wire 4 in the fourth embodiment. The lower-layer portion 42 contributes to the stability of winding of the second wire 4 near the first end 7 and reduces the occurrence of displacement of the second wire 4.

Figure 7:
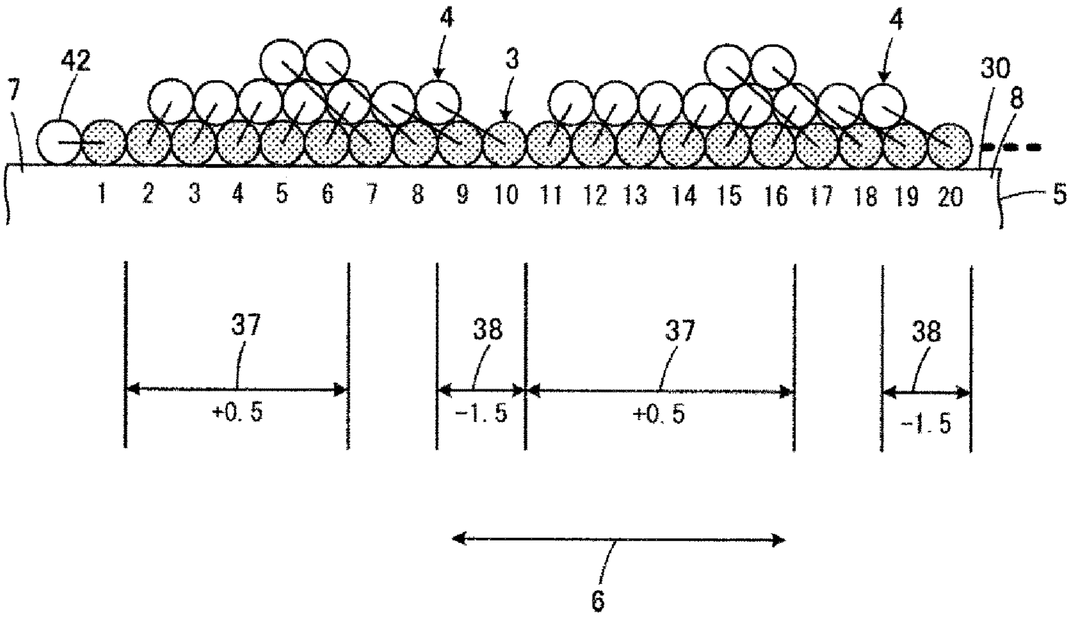
FIG. 7 is a cross-sectional view illustrating part of the winding core portion around which the first wire and the second wire are wound in a coil component according to a fifth embodiment of the disclosure.

In the fifth embodiment illustrated in FIG. 7, the second wire 4 includes multiple sets of the first portion, the second portion, the third portion, the fourth portion, and the fifth portion, the first to fifth portions being described in i) to v) above. The multiple sets are disposed along the winding core portion 5 in the axial direction 6. In a region illustrated in FIG. 7, two sets of the first portion, the second portion, the third portion, the fourth portion, and the fifth portion are disposed along the winding core portion 5 in the axial direction 6.

In the embodiment illustrated in FIG. 7, the second portions and the fourth portions of the second wire 4 are positioned, as can be inferred from FIGS. 2A and 2B, on the same peripheral surface of the winding core portion 5, for example, on the first side surface 31 of the winding core portion 5 (see FIGS. 2A and 2B). With this configuration, the occurrence of disorderly winding of the wires 3 and 4 can be reduced.

Figure 8:
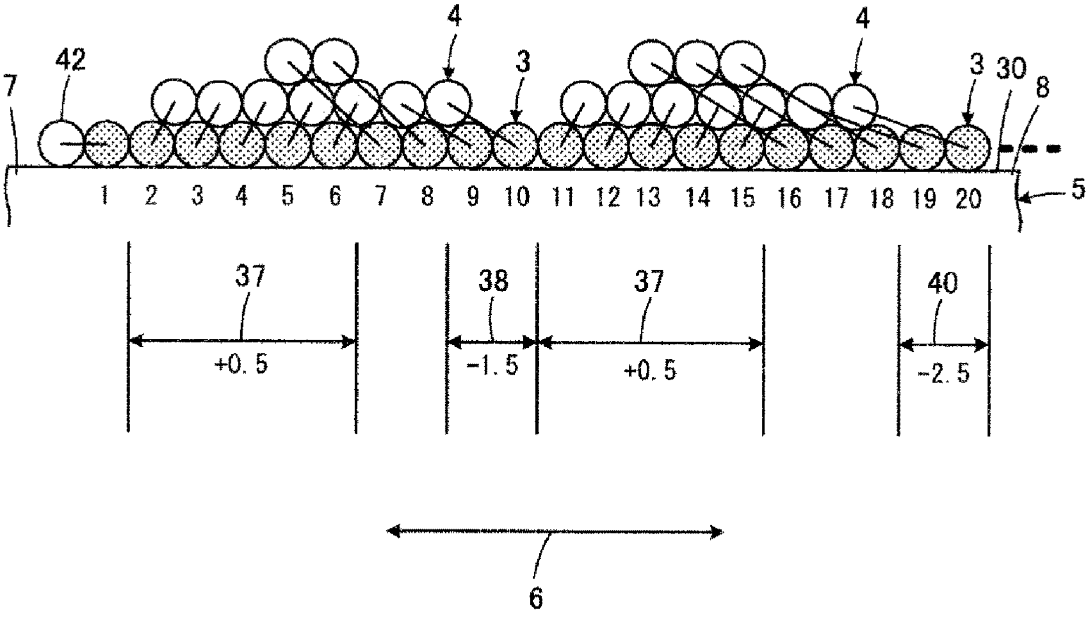
FIG. 8 is a cross-sectional view illustrating part of the winding core portion around which the first wire and the second wire are wound in a coil component according to a sixth embodiment of the disclosure.

In the sixth embodiment illustrated in FIG. 8, the second wire 4 includes multiple sets of the first portion, the second portion, the third portion, the fourth portion, and the fifth portion, and the multiple sets are disposed along the winding core portion 5 in the axial direction 6, as is the case for the fifth embodiment illustrated in FIG. 7. In the sixth embodiment, however, the number of turns of the second wire 4 is different between at least two of the multiple third portions in which the second wire 4 is wound around so as to form the third layers.

More specifically, in FIG. 8, the second wire 4 is wound around twice in the third portion on the left, whereas the second wire 4 is wound around three times in the third portion on the right. As a result, a −1.5 shift region 38, in which the second wire 4 is positionally shifted from the first wire 3 by −1.5 turns, is formed in the fifth portion on the left (turns T8 to T9) in which the second wire 4 is wound so as to form the second layer in the direction from the first end 7 toward the second end 8, whereas a −2.5 shift region 40, in which the second wire 4 is positionally shifted from the first wire 3 by −2.5 turns, is formed in the fifth portion on the right (turns T19 to T20) in which the second wire 4 is wound so as to form the second layer in the direction from the first end 7 toward the second end 8.

The embodiments illustrated in FIGS. 7 and 8 may be adopted in the case of further adjusting the capacitance balance between the first wire 3 and the second wire 4.

Figure 9:
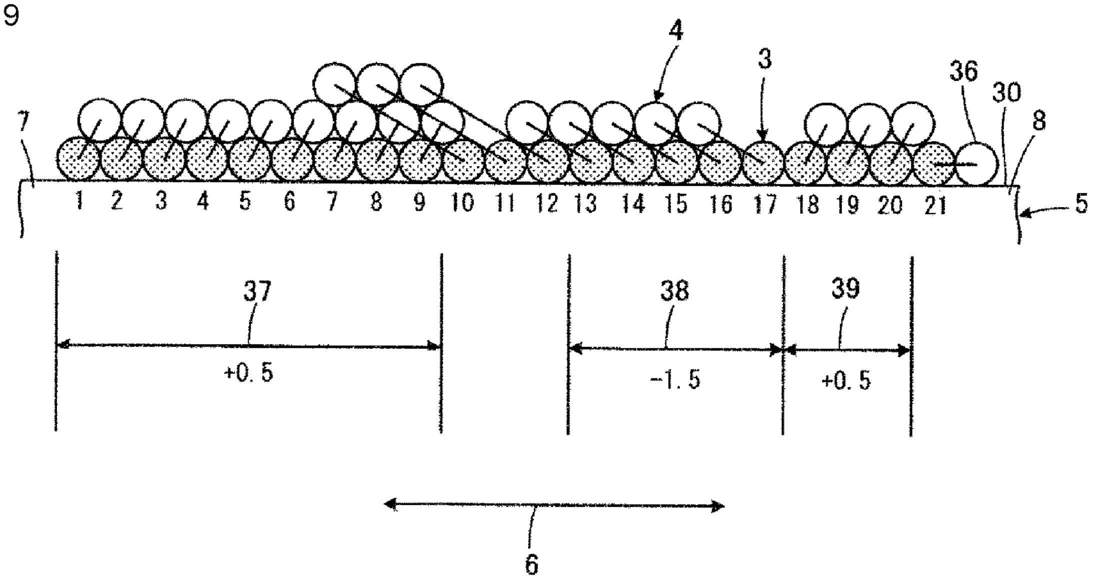
FIG. 9 is a cross-sectional view illustrating part of the winding core portion around which the first wire and the second wire are wound in a coil component according to a seventh embodiment of the disclosure.

In the seventh embodiment illustrated in FIG. 9, the fifth portion (turns T13 to T17) continues from the fourth portion (turns T10 to T12), and, in the fifth portion, the second wire 4 is wound around the outer side of the first layer so as to form the second layer in the direction from the first end 7 toward the second end 8 while turns of the second wire 4 fit in recesses formed between adjacent turns of the first wire 3 in the first layer. In the seventh embodiment, however, the fifth portion (turns T13 to T17) is positioned one turn of the second wire 4 away from the first portion (turns T1 to T9). A −(N−1.5) shift region is a region in which the second wire 4 is positionally shifted from the first wire 3 by (N−1.5) turns in a shifting direction opposite to the shifting direction in the +0.5 shift region 37. The −(N−1.5) shift region, more specifically a −1.5 shift region 38, is present on the side closer to the second end 8 with respect to the boundary between the first portion (turns T1 to T9) and the fifth portion (turns T13 to T17).

Figure 10:
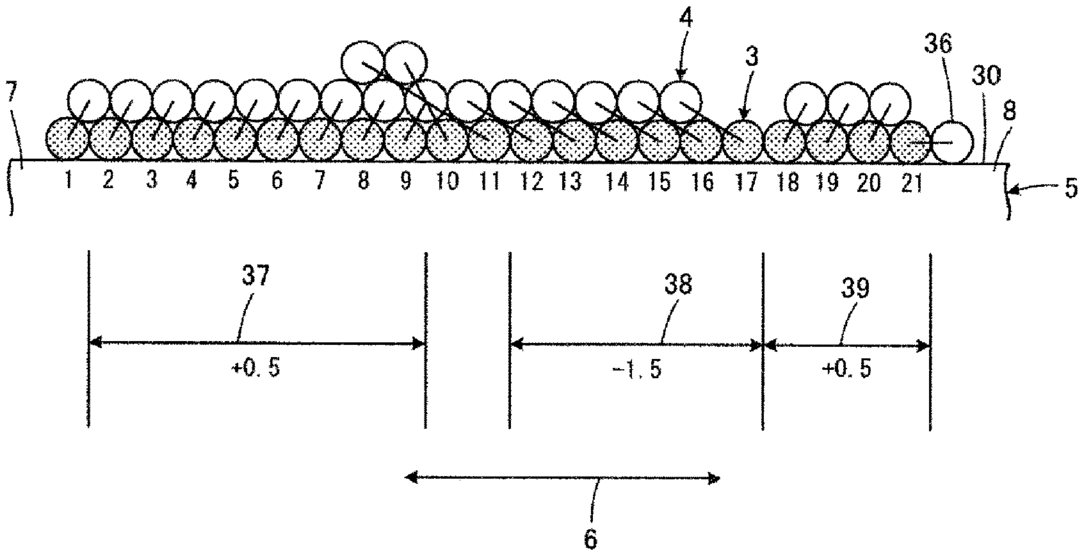
FIG. 10 is a cross-sectional view illustrating part of the winding core portion around which the first wire and the second wire are wound in a coil component according to an eighth embodiment of the disclosure.

In the eighth embodiment illustrated in FIG. 10, the third portion (the turn T10 and a turn T11) continues from the second portion 34. In the third portion, the second wire 4 is wound around the outer side of the second layer so as to form the third layer. In the eighth embodiment, however, the second wire 4 is wound around in a direction from the second end 8 toward the first end 7 as opposed to those described in the first to sixth embodiments. This configuration can be also applied to the winding of the second wire 4 in the first to seventh embodiments.

Embodiments of the present disclosure have been described in relation to the coil component serving as the common mode choke coil. The present disclosure, however, can be applied to other devices, such as wire-wound chip transformers. Note that the embodiments illustrated herein are examples, and configurations can be partially replaced or combined with one another between different embodiments.

Embodiments of the present disclosure can be characterized by the following features.

<1> A coil component includes a core including a winding core portion having a first end and a second end, the first end and the second end being opposite to each other in an axial direction of the winding core portion and also includes a first wire and a second wire that are wound helically around the winding core portion and have a substantially same number of turns around the winding core portion. The first wire and/or the second wire forms layers of turns around the winding core portion, and the layers includes a first layer positioned closest to peripheral surfaces of the winding core portion, a second layer formed on an outer side of the first layer, and a third layer formed on an outer side of the second layer. The first wire includes a portion in which the first wire is wound around the winding core portion so as to form the first layer in a direction from the first end toward the second end. The second wire includes: i) a first portion in which the second wire is wound around the outer side of the first layer so as to form the second layer in the direction from the first end toward the second end while turns of the second wire fit in recesses formed between adjacent turns of the first wire; ii) a second portion that continues from the first portion and in which the second wire turns back toward the first end from an end of the first portion positioned closer to the second end and extends to the outer side of the second layer; iii) a third portion that continues from the second portion and in which the second wire is wound around the outer surface of the second layer so as to form the third layer; iv) a fourth portion that extends from the third portion to the second layer on the outer side of the first layer; and v) a fifth portion that continues from the fourth portion and in which the second wire is wound around the outer side of the first layer so as to form the second layer in the direction from the first end toward the second end while turns of the second wire fit in recesses formed between adjacent turns of the first wire in the first layer. The second wire is wound by N turns (N is a natural number equal to or greater than two) in the third portion. A+0.5 shift region, which is a region in which the second wire is positionally shifted from the first wire by 0.5 turns, is present on either one of a side closer to the first end and a side closer to the second end with respect to a boundary between the first portion and the fifth portion. A −(N−0.5) shift region, which is a region in which the second wire is positionally shifted from the first wire by (N−0.5) turns in a shifting direction opposite to a shifting direction of the +0.5 shift region, is present on the other one of the side closer to the first end and the side closer to the second end with respect to the boundary between the first portion and the fifth portion.

<2> A coil component includes a core including a winding core portion having a first end and a second end, the first end and the second end being opposite to each other in an axial direction of the winding core portion and also includes a first wire and a second wire that are wound helically around the winding core portion and have a substantially same number of turns around the winding core portion. The first wire and/or the second wire forms layers of turns around the winding core portion, the layers including a first layer positioned closest to peripheral surfaces of the winding core portion, a second layer formed on an outer side of the first layer, and a third layer formed on an outer side of the second layer. The first wire includes a portion in which the first wire is wound around the winding core portion so as to form the first layer in a direction from the first end toward the second end. The second wire includes: i) a first portion in which the second wire is wound around the outer side of the first layer so as to form the second layer in the direction from the first end toward the second end while turns of the second wire fit in recesses formed between adjacent turns of the first wire; ii) a second portion that continues from the first portion and in which the second wire turns back toward the first end from an end of the first portion positioned closer to the second end and extends to the outer side of the second layer; iii) a third portion that continues from the second portion and in which the second wire is wound around the outer surface of the second layer so as to form the third layer; iv) a fourth portion that extends from the third portion to the second layer on the outer side of the first layer; and v) a fifth portion that continues from the fourth portion and is positioned one turn of the second wire away from the first portion and in which the second wire is wound around the outer side of the first layer so as to form the second layer in the direction from the first end toward the second end while turns of the second wire fit in recesses formed between adjacent turns of the first wire in the first layer. The second wire is wound by N turns (N is a natural number equal to or greater than two) in the third portion. A +0.5 shift region, which is a region in which the second wire is positionally shifted from the first wire by 0.5 turns, is present on either one of a side closer to the first end and a side closer to the second end with respect to a boundary between the first portion and the fifth portion. A −(N−1.5) shift region, which is a region in which the second wire is positionally shifted from the first wire by (N−1.5) turns in a shifting direction opposite to a shifting direction of the +0.5 shift region, is present on the other one of the side closer to the first end and the side closer to the second end with respect to the boundary between the first portion and the fifth portion.

<3> In the coil component described in <1> or <2> above, the core includes a first flange and a second flange that are formed so as to project from the first end and the second end of the winding core portion, respectively, and the first flange and the second flange have respective bottom surfaces that face a circuit board on which the coil component is mounted and respective top surfaces facing opposite to the bottom surfaces. Terminal electrodes are formed on the bottom surfaces, and end portions of the first wire and end portions of the second wire are connected to corresponding ones of the terminal electrodes. The second portion and the fourth portion of the second wire are positioned at a peripheral surface of the winding core portion, the peripheral surface facing in a direction different from directions in which the top surface and the bottom surface face.

<4> In the coil component described in any one of <1> to <3> above, the second wire includes a lower-layer portion at an end of at least one of the first portion and the fifth portion, the lower-layer portion being positioned at a level of the first layer formed by the first wire and being in contact with the peripheral surfaces of the winding core portion.

<5> In the coil component described in any one of <1> to <4> above, the second wire includes multiple sets of the first portion, the second portion, the third portion, the fourth portion, and the fifth portion, and the multiple sets are disposed along the winding core portion in the axial direction.

<6> In the coil component described in <5> above, a plurality of the second portions and a plurality of the fourth portions, which are included in the second wire, are positioned at one peripheral surface of the winding core portion.

<7> In the coil component described in <5> or <6> above, the number of turns of the second wire around the winding core portion is different between at least two of a plurality of the third portions.

What is claimed is:

1. A coil component comprising:

a core including a winding core portion having a first end and a second end, the first end and the second end being opposite to each other in an axial direction of the winding core portion; and a first wire and a second wire that are wound helically around the winding core portion and have a substantially same number of turns around the winding core portion, wherein at least one of the first wire and the second wire configures layers of turns around the winding core portion, the layers including a first layer closest to peripheral surfaces of the winding core portion, a second layer on an outer side of the first layer, and a third layer on an outer side of the second layer, the first wire includes a portion in which the first wire is wound around the winding core portion to configure the first layer in a direction from the first end toward the second end, the second wire includes a first portion in which the second wire is wound around the outer side of the first layer to configure the second layer in the direction from the first end toward the second end while turns of the second wire are in recesses between adjacent turns of the first wire, a second portion that continues from the first portion and in which the second wire turns back toward the first end from an end of the first portion that is closer to the second end and extends to the outer side of the second layer, a third portion that continues from the second portion and in which the second wire is wound around the outer side of the second layer to configure the third layer, a fourth portion that extends from the third portion to the second layer on the outer side of the first layer, and a fifth portion that continues from the fourth portion and in which the second wire is wound around the outer side of the first layer to configure the second layer in the direction from the first end toward the second end while turns of the second wire are in recesses between adjacent turns of the first wire in the first layer, the second wire is wound by N turns (N is a natural number equal to or greater than two) in the third portion, a +0.5 shift region, which is a region in which the second wire is positionally shifted from the first wire by 0.5 turns, is on either one of a side closer to the first end and a side closer to the second end with respect to a boundary between the first portion and the fifth portion, and a −(N−0.5) shift region, which is a region in which the second wire is positionally shifted from the first wire by (N−0.5) turns in a shifting direction opposite to a shifting direction of the +0.5 shift region, is on the other one of the side closer to the first end and the side closer to the second end with respect to the boundary between the first portion and the fifth portion.

2. The coil component according to claim 1, wherein the core includes a first flange and a second flange that project from the first end and the second end of the winding core portion, respectively, the first flange and the second flange have respective bottom surfaces that face a circuit board on which the coil component is configured to be mounted and respective top surfaces facing opposite to the bottom surfaces, terminal electrodes are on the bottom surfaces, and end portions of the first wire and end portions of the second wire are connected to corresponding ones of the terminal electrodes, and the second portion and the fourth portion of the second wire are at a peripheral surface of the winding core portion, the peripheral surface facing in a direction other than directions in which the top surface and the bottom surface face.

3. The coil component according to claim 1, wherein the second wire includes a lower-layer portion at an end of at least one of the first portion and the fifth portion, the lower-layer portion of the second wire being side by side at a same level as the first layer constituted by the first wire and the lower-layer portion of the second wire being in contact with the peripheral surfaces of the winding core portion.

4. The coil component according to claim 1, wherein the second wire includes multiple sets comprising the first portion, the second portion, the third portion, the fourth portion, and the fifth portion, and the multiple sets are along the winding core portion in the axial direction.

5. The coil component according to claim 4, wherein a plurality of the second portions and a plurality of the fourth portions, which are included in the second wire, are at a same position to each other in a circumferential direction of the winding core portion.

6. The coil component according to claim 4, wherein a number of turns of the second wire around the winding core portion is different between at least two of a plurality of the third portions.

7. A coil component comprising:

a core including a winding core portion having a first end and a second end, the first end and the second end being opposite to each other in an axial direction of the winding core portion; and a first wire and a second wire that are wound helically around the winding core portion and have a substantially same number of turns around the winding core portion, wherein at least one of the first wire and the second wire configures layers of turns around the winding core portion, the layers including a first layer that is closest to peripheral surfaces of the winding core portion, a second layer on an outer side of the first layer, and a third layer on an outer side of the second layer, the first wire includes a portion in which the first wire is wound around the winding core portion to configure the first layer in a direction from the first end toward the second end, the second wire includes a first portion in which the second wire is wound around the outer side of the first layer to configure the second layer in the direction from the first end toward the second end while turns of the second wire are in recesses between adjacent turns of the first wire, a second portion that continues from the first portion and in which the second wire turns back toward the first end from an end of the first portion that is closer to the second end and extends to the outer side of the second layer, a third portion that continues from the second portion and in which the second wire is wound around the outer side of the second layer to configure the third layer, a fourth portion that extends from the third portion to the second layer on the outer side of the first layer, and a fifth portion that continues from the fourth portion and is one turn of the second wire away from the first portion and in which the second wire is wound around the outer side of the first layer to configure the second layer in the direction from the first end toward the second end while turns of the second wire are in recesses between adjacent turns of the first wire in the first layer, the second wire is wound by N turns (N is a natural number equal to or greater than two) in the third portion, a +0.5 shift region, which is a region in which the second wire is positionally shifted from the first wire by 0.5 turns, is present on either one of a side closer to the first end and a side closer to the second end with respect to a boundary between the first portion and the fifth portion, and a −(N−1.5) shift region, which is a region in which the second wire is positionally shifted from the first wire by (N−1.5) turns in a shifting direction opposite to a shifting direction of the +0.5 shift region, is present on the other one of the side closer to the first end and the side closer to the second end with respect to the boundary between the first portion and the fifth portion.

8. The coil component according to claim 7, wherein the core includes a first flange and a second flange that project from the first end and the second end of the winding core portion, respectively, the first flange and the second flange have respective bottom surfaces that face a circuit board on which the coil component is configured to be mounted and respective top surfaces facing opposite to the bottom surfaces, terminal electrodes are on the bottom surfaces, and end portions of the first wire and end portions of the second wire are connected to corresponding ones of the terminal electrodes, and the second portion and the fourth portion of the second wire are at a peripheral surface of the winding core portion, the peripheral surface facing in a direction other than directions in which the top surface and the bottom surface face.

9. The coil component according to claim 7, wherein the second wire includes a lower-layer portion at an end of at least one of the first portion and the fifth portion, the lower-layer portion of the second wire being side by side at a same level as the first layer constituted by the first wire and the lower-layer portion of the second wire being in contact with the peripheral surfaces of the winding core portion.

10. The coil component according to claim 7, wherein the second wire includes multiple sets comprising the first portion, the second portion, the third portion, the fourth portion, and the fifth portion, and the multiple sets are along the winding core portion in the axial direction.

11. The coil component according to claim 10, wherein a plurality of the second portions and a plurality of the fourth portions, which are included in the second wire, are at a same position to each other in a circumferential direction of the winding core portion.

12. The coil component according to claim 10, wherein the number of turns of the second wire around the winding core portion is different between at least two of a plurality of the third portions.

* * * * *